March 14, 1967    D. J. BOOTY ETAL    3,308,992
DISPENSING APPARATUS
Filed May 28, 1965    2 Sheets-Sheet 1
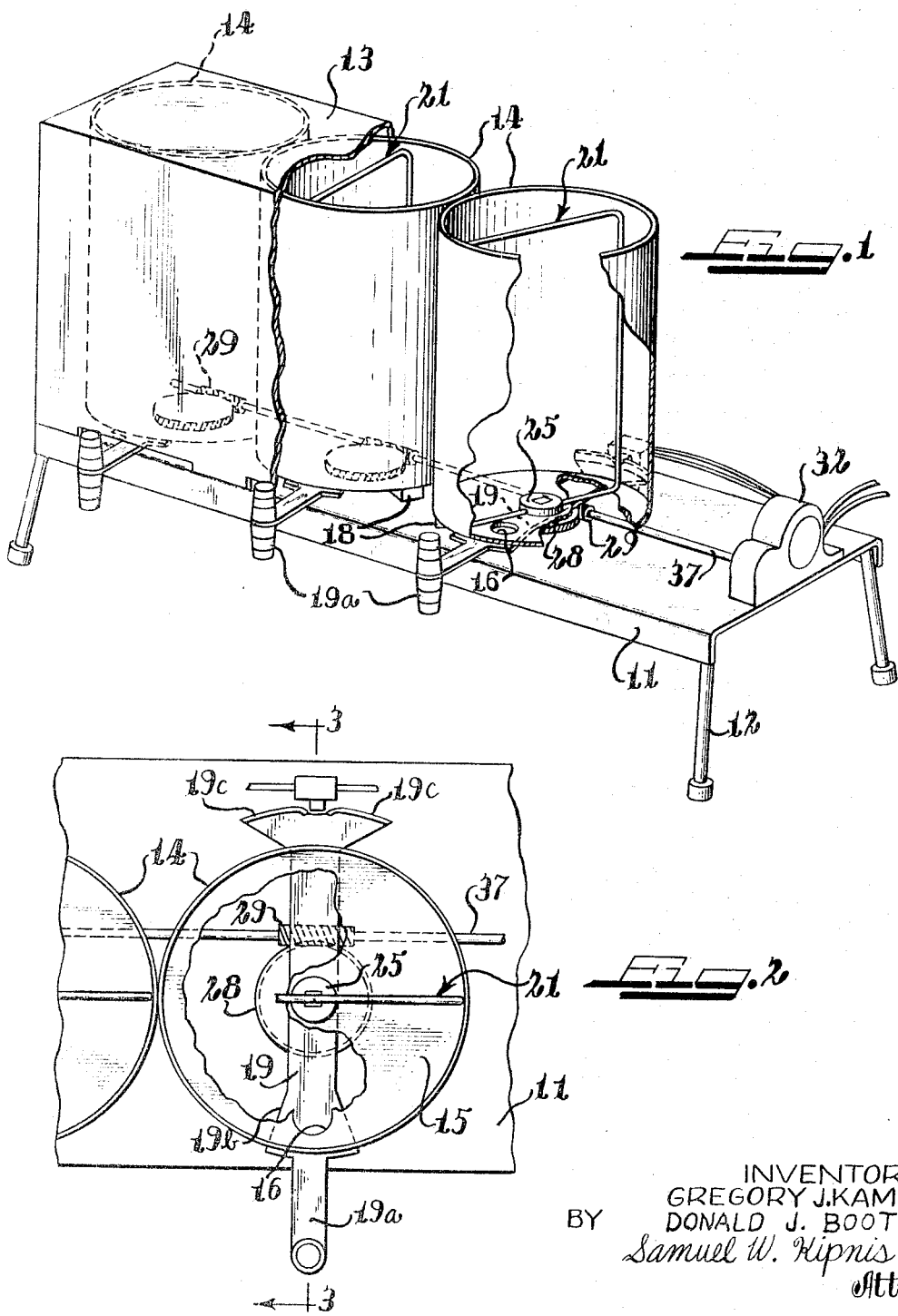
INVENTORS.
GREGORY J. KAMKA and
DONALD J. BOOTY
BY Samuel W. Kipnis
Atty.

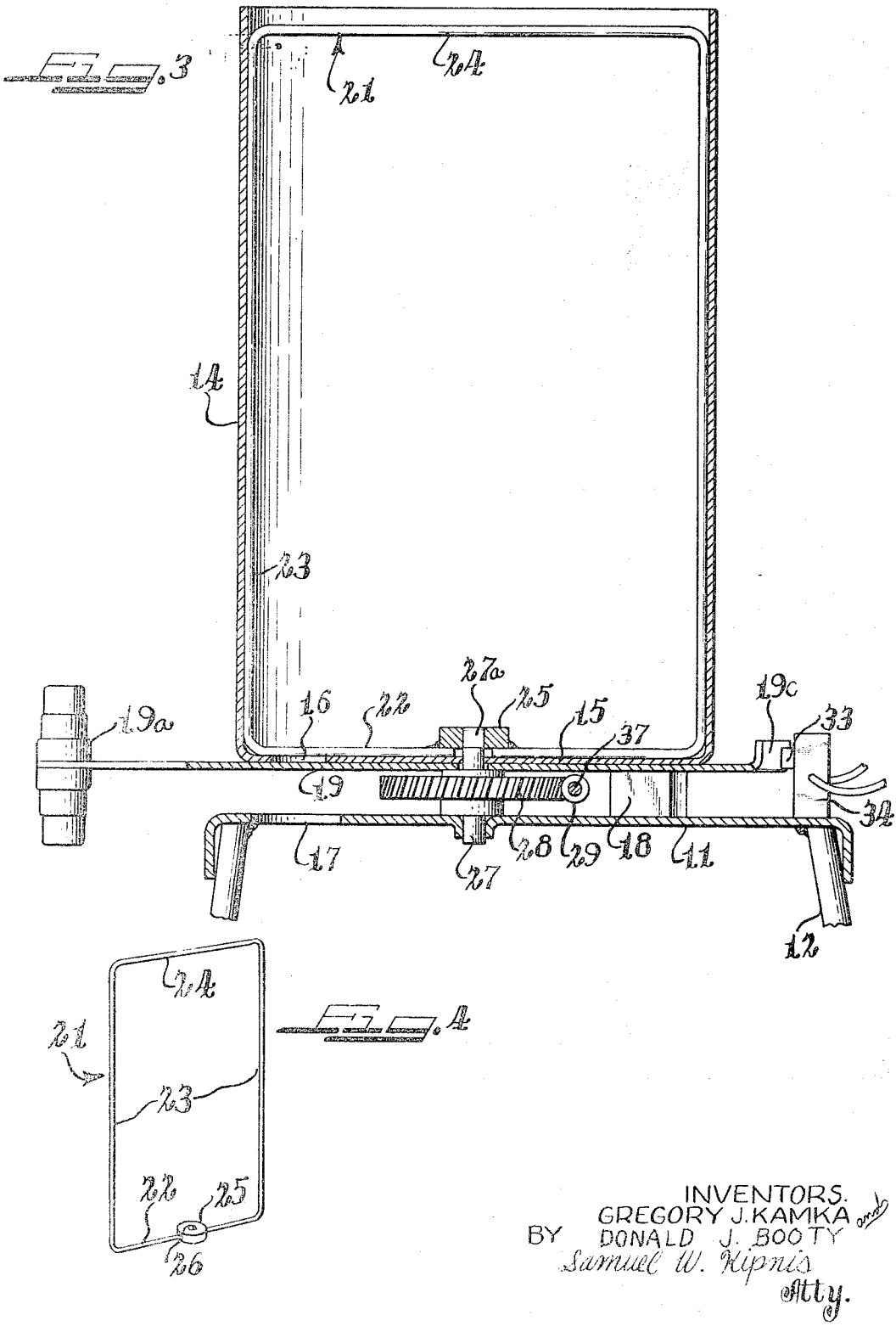

3,308,992
DISPENSING APPARATUS
Donald J. Booty, Oak Forest, and Gregory J. Kamka, Chicago, Ill., assignors to Arnold Schechter, Chicago, Ill.
Filed May 28, 1965, Ser. No. 459,760
7 Claims. (Cl. 222—76)

This invention relates to improvements in a canister type dispensing apparatus and is particularly concerned with the construction and assembly of a dispenser for free flowing solid material which is automatic in its operation.

More particularly, the improved structure, which is intended for household use, includes a housing enclosing one or more canisters each adapted to contain a supply of coffee, sugar, flour or like free flowing solid material. Each canister has a dispensing opening each normally closed by a manually actuated valve structure. Means is provided within each canister to disturb or otherwise agitate the contents during dispensing operation to effect semi-aeration of the material to prevent lumping caused by excessive moisture, and thus insure the discharge of its contents through an open dispensing opening. Such means is driven by an electric motor, the starting switch of which is controlled by the opening and closing of any one of the valve structures.

It is therefore an object of this invention to provide a novelly constructed and assembled canister type dispenser.

Another object is to provide a novel valve structure for dispensing apparatus.

Another object is to provide a novel combination valve and switch structure.

Another object of the invention is to provide novel agitating means.

The structure by means of which the above noted and other objects and advantages of the invention are attained will be described in the following specification, taken in conjunction with the accompanying drawings, showing a preferred illustrative embodiment of the invention, in which:

FIG. 1 is a perspective view, with parts broken away, of the canister type dispensing apparatus.

FIG. 2 is a top plan view of one of the three like canisters, showing the canister bottom broken away in part.

FIG. 3 is an enlarged vertical sectional view of a canister, taken substantially on line 3—3 of FIG. 2.

FIG. 4 is a perspective view of one of the agitators.

Referring to the exemplary disclosure of the invention shown in the accompanying drawings, the dispensing apparatus includes a base plate 11 suitably supported by depending legs 12 and having an enclosing housing 13 removably mounted thereon. The base plate 11 affords mounting means for a plurality of open top cylindrical canisters 14, and for common drive means to be described presently. The bottom wall 15 of each canister has a dispensing opening 16 therein which is in vertical alignment with a corresponding opening 17 in base plate 11 so as to permit dispensing of canister contents into a suitable container (not shown) arranged beneath the base plate. The canisters are suitably supported, as for example, by spacers 18 spaced above the base plate 11. Each dispensing opening is normally closed by a valve lever 19 arranged beneath the canister and having its handle portion 19a projecting from the front side of housing 13 for manual engagement.

In order to prevent formation of lumps caused by excessive moisture and to semi-aerate the contents of each canister, each canister is fitted with an agitator 21.

As best shown in FIG. 4, the agitator 21 is in the form of a wire or rod-like rectangular loop including a bottom rail 22, upstanding side rails 23 and a top connecting rail 24. The bottom rail 22 mounts a mounting hub 25 having a non-circular hole 26 therein. When in place within a canister, the agitator bottom rail 22 will be in substantial wiping contact with the canister bottom wall 15 whereas the upstanding side rails 23 will have wiping contact with the cylindrical wall of said canister. In operation, the agitator is rotated on a vertical axis in a manner and by means to be described, at a rate of about 25 to 50 r.p.m.

The means for driving the agitator includes a mounting shaft 27 (FIG. 3) journalled at its bottom end in the base plate and which extends upwardly through the bottom wall of the canister and has a non-circular terminal portion 27a that receives the mounting hub 25 thereover. A gear 28 is secured firmly on said shaft 27 above base plate 11. Meshed with said gear in a worm gear 29 mounted firmly on a horizontal drive shaft 37. This shaft is of sufficient length to reach all of the canisters and mount a worm gear 29 for the agitator gear in each. One end of said shaft is connected to an electric motor 32. Obviously, when the motor is operated the agitator in each of the canisters is actuated.

Also arranged beneath each canister and above the related gear 28, is one valve lever 19. As best shown in FIG. 2, this lever is mounted for free rotation on its related shaft 27 and it has a relatively wide area 19b of sufficient size to normally close off the dispensing opening 16. The rear or innermost end of said lever is formed with a pair of spaced cam surfaces 19c between which extends the operating plunger 33 of a normally open electric switch 34. There is one switch for each canister and all three are connected in parallel in the circuit to the motor 32 so as to supply current to the motor when any one of said switches is closed.

Now, when a selected one of said levers 19 is shifted in either direction to open a dispensing opening, one or the other of the cam surfaces 19c thereon will engage plunger 33 on a related switch so as to close the circuit to the motor and actuate all of the agitators. When the valve element is returned to closed position the switch opens. It should be evident that the structure is such that upon opening manipulation of either valve lever, the motor is started to acuate the agitators and insure free flow of the contents from the related canister out through the open dispensing opening.

Although we have described a preferred embodiment of our invention, in considerable detail, it will be understood that the description thereof is intended to be illustrative, rather than restrictive, as many details of the structure disclosed may be modified or changed without departing from the spirit or scope of the invention. Accordingly, we do not desire to be restricted to the exact construction described.

We claim:

1. Dispensing apparatus comprising, in combination, a base plate, a plurality of canisters mounted on said base plate, each canister having a bottom wall and a dispensing opening in said bottom wall, separate valve means for each dispensing opening movable into open and closed positions, an agitator in each canister, common electric drive means for said agitators, and normally open electric switches connected in parallel with said electric drive means, and means on each said valve means operable to close a selected one of said switches when a related valve means is moved into open position.

2. Dispensing apparatus comprising, in combination, an upstanding cylindrical container including a circumferential wall and a bottom wall, a substantially loop-shaped agitator mounted in said container, said agitator being disposed in a vertical plane and being rotatable on a vertical axis, electric drive means operable to rotate said agitator about its axis, a discharge opening in the container bottom wall, valve means operable to open and close said discharge opening, an electric circuit for said drive means, an on-off switch in said circuit, and means connecting said valve means with said switch so as to actuate the switch each time the valve means is actuated.

3. The dispensing apparatus recited in claim 2, in which the valve means comprises an oscillatable gate valve.

4. Dispensing apparatus comprising, in combination, a container having a discharge opening in its bottom, an agitator rotatable within said container, an electric motor for driving said agitator, a gate valve operable to open and close said discharge opening, and a normally open switch in the electric circuit to said motor operably connected with said gate valve and operable to close the circuit when the gate valve is moved into open position.

5. Dispensing apparatus comprising, in combination, a base plate, a plurality of canisters mounted on said base plate, each canister having a bottom wall and a dispensing opening in said bottom wall, separate valve means for each dispensing opening movable into open and closed positions, an agitator in each canister, common electric drive means for said agitators, and normally open electric switches connected in parallel with said electric drive means one operably associated with each valve means adapted to be closed when the related valve means is moved into open position, said valve means being rotatable in a horizontal plane and having cam surfaces engageable with the related switch.

6. Dispensing apparatus comprising, in combination, a base plate, a plurality of canisters mounted on said base plate, each canister having a bottom wall and a dispensing opening in said bottom wall, separate valve means for each dispensing opening movable into open and closed positions, an agitator in each canister, common electric drive means for said agitators, said drive means including a gear on each agitator and a common drive shaft including gears meshed one with each agitator gear, and normally open electric switches connected in parallel with said electric drive means, one operably associated with each valve means adapted to be closed by said valve means when the related valve means is moved into open position.

7. Dispensing apparatus comprising, in combination, a plurality of canisters, each canister having a bottom wall and a dispensing opening in said bottom wall, separate valve means for each dispensing opening movable into open and closed positions, an agitator in each canister, common electric drive means for said agitators, normally open electric switches connected in parallel with said electric drive means, and means on each said valve means operable to close one of said switches when a related valve means is moved into open position.

References Cited by the Examiner
UNITED STATES PATENTS

| | | | |
|---|---|---|---|
| 1,306,313 | 6/1919 | Poulos | 222—247 |
| 2,923,438 | 2/1960 | Logan et al. | 222—2 |
| 2,985,339 | 5/1961 | Fischer et al. | |
| 3,207,488 | 9/1965 | Brasington | 259—135 X |

ROBERT B. REEVES, *Primary Examiner.*

HADD S. LANE, *Examiner.*